Patented July 23, 1935

2,009,173

UNITED STATES PATENT OFFICE 2,009,173

ARTIFICIAL RESIN AND PROCESS OF MAKING SAME

Alphonse Gams, Gustave Widmer, and Karl Frey, Basel, Switzerland, assignors, by mesne assignments, to Ciba Products Corporation, Dover, Del.

No Drawing. Application January 18, 1929, Serial No. 333,510. In Switzerland December 21, 1927

3 Claims. (Cl. 260—3)

The present invention relates to condensation products of carbamides with formaldehyde. It comprises the process of manufacture thereof, the new products themselves, as well as the application of the same in the industry of varnishes, lacquers and artificial materials.

The manufacture of lacquers and artificial materials generally from resins made from aldehydes and carbamides, particularly from urea and formaldehyde, is beset with considerable difficulties. The latter are chiefly due to the fact that the products are not sufficiently stable to reaction with various agents, such as cold water, and in particular hot water. For overcoming these difficulties a process has been proposed for initially diminishing the solubility in water of the liquid resin, whereby a hardened final product of diminished solubility in water is also obtained. For this purpose urea is condensed with formaldehyde in the proportion of 1:2 molecules, or somewhat greater, by short boiling in alkaline or neutral solution, whereby the first condensation stage of the resin is obtained as a still completely water-soluble and alcohol-soluble liquid. This is then boiled in a second stage of the process in presence of hydrogen ions, that is to say in acid solution (with about pH=3-5) with a substance which has a tendency in acid solution to form a condensation product with formaldehyde, the boiling being continued until the water-insoluble condensation product separates from the cooled solution. By suitable working up there is obtained finally a neutral hydrophobe resin which can be used for lacquers and artificial masses.

The present invention is based on the observation that, contrary to the foregoing statement, it is not necessary to carry out this process of resinifying in presence of hydrogen-ions, but that hydrophobe resins may be produced smoothly from urea and formaldehyde, by conducting the resinification process in presence of free OH-ions, there being added either at the beginning of the condensation, or after a certain stage of condensation has been attained, a substance which is capable in presence of free OH-ions to form with formaldehyde or its condensation products hydrophobe resins.

This observation leads to a simplification of the known process in that a performance of the process in two stages, namely, a first stage in the absence of free hydrogen-ions and then in a second stage of quite definite limits in respect of hydrogen-ion concentration, is eliminated. In the new process on the other hand, the whole condensation up to the separation of the hydrophobe resin, may be conducted, if desired, in a single alkaline reaction.

It is known to obtain a powder which is capable of being pressed by diluting the aqueous solution of a sol, obtained from condensation products of urea or its derivatives and formaldehyde, with water to such an extent that no gelatinization can take place during the subsequent treatment, and thereupon throwing down a dehydrated apparently amorphous, flocculent precipitate from the diluted solution by the addition of flocculating agents, such as, for example, electrolytes or albumen precipitants. The characteristic features of this process are thus, firstly, the working in a very dilute solution, and secondly, the addition of flocculating agents to the diluted solution of the condensation product. According to applicants' process neither dilution occurs during the condensation process, nor are there additions made to the solution which under applicants' conditions of working can act as flocculating agents.

As agents yielding OH-ions there may be used alkalies, ammonia, organic and inorganic bases, basic salts or the like. As additions which tend to react with formaldehyde or formaldehyde condensation products in the presence of OH-ions may be named, for example, aromatic amines, such as aniline, naphthylamine, or their derivatives, such as anhydroformaldehyde-aniline, substituted ureas or urea derivatives, such as phenylurea, thio-urea, cyanamide derivatives, such as dicyandiamide, acid amides of high molecular weight, such as biuret, and finally mono- or polyhydricphenols, such as phenol, resorcinol, naphthol, pyrogallol, as well as phenol derivatives, like tannin. All these substances yield under the above-mentioned conditions white to feebly colored (according to the color or purity of the components used) very hydrophobe resins which can be kneaded with water and purified, just as for example the liquid phenol-formaldehyde resins or the like sulfurized phenol-resins can be purified. According to the conditions of reaction and the choice of the parent materials, the viscosity and solubility of the resins obtained may be widely varied. Resins to be used as lacquers are advantageously isolated in a phase of the condensation in which they are still soluble in dilute alcohol.

The resinification is in no way connected with the aqueous medium. If the substance to be used does not dissolve sufficiently in the hot aqueous solution it is possible to work equally well in organic solution by adding to the aqueous solution the necessary quantity of alcohol, acetone or other suitable organic solvent.

The addition of the secondary resinification component may be made at any stage of the condensation. It may be to an initial condensation product still completely soluble in alcohol and water or to a condensation solution already capable of yielding a strong precipitate on addition of water. In each case the added substance is boiled further with the condensation solution in presence of free OH-ions until the water-insolubility of the resin formed has become so great that either on cooling the resin separates in the solution in the form of an oily or resinous layer or is separated in this form on addition of cold water. If the second resinification component is added at the beginning of the process the reaction is still more simple than that described above. The substance to be added is substituted for an equivalent quantity of urea, the mixture is dissolved in formaldehyde, the substance yielding OH-ions is added and the whole is boiled, preferably in a closed vessel, until the resin has attained the desired insolubility in water. In this case in particular it is advantageous to use a polymerized formaldehyde as this is freely soluble in alkaline solution, as is known.

It has further been found that these resins, which are formed in alkaline solution, can very well be hardened in alkaline solution. This connotes a further considerable technical advance, particularly in the application of the resins in the varnish industry. A whole series of very important pigments, such as zinc white, white lead, ferric oxide and mineral colors are of a basic nature, and in particular the supports on which the varnish or lacquer is to be spread are often of basic character, for instance pottery or artificial stone. In the case of resins that require acid hardening these pigments must be completely excluded and it is difficult to find a substitute, especially for zinc white; moreover, the acid hardening is apt to have an ill-effect upon the alkaline surfaces. All these disadvantages vanish as a result of the present invention, since the product is hardened in the presence of alkali, that is to say of OH-ions.

In the manufacture of solid artificial materials the alkaline hardening has the advantage that the formaldehyde formation which always occurs in the acid hardening, is avoided.

The following examples illustrate the invention:—

*Example 1*

90 kilos of urea (1½ mol.), 68 kilos of phenyl-urea (½ mol.) and 300 litres of formaldehyde of 40 per cent. strength (4 mol.) are mixed with 20 litres of caustic soda solution of 10 per cent. strength; by a short heating the whole is dissolved; the solution is filtered, if necessary, and heated in a closed vessel in a boiling water-bath for 4 hours. The vessel is then allowed to cool over-night. The solution is viscous, slightly turbid and of alkaline reaction. On addition of water there is precipitated a white resin of silky lustre, soluble in dilute alcohol and capable of being worked up in known manner to form a lacquer or a solid artificial material.

*Example 2*

105 kilos of urea (1¾ mol.), 19 kilos of thiourea (¼ mol.) and 300 litres of formaldehyde of 40 per cent. strength (4 mol.) are heated with 15 litres of caustic soda solution of 10 per cent. strength in a closed vessel at 98° C. for 4½ hours. There is produced an oily condensation solution of alkaline reaction, from which on cooling or mixing with water there separates a silky resin, soluble in alcohol of 50 per cent. strength and capable of being worked up like the resin described in Example 1.

*Example 3*

1 molecular proportion of urea is dissolved in 2 molecular proportions of aqueous formaldehyde of 40 per cent. strength and the solution is thoroughly stirred with active carbon amounting to about 10 per cent. of the weight of the urea used. The solution is then passed through a filter press whereby it is obtained in a clear and neutral condition. It is heated in an autoclave at about 100° C. until a sample yields a milky precipitate when diluted with water.

300 kilos of this condensation solution are boiled, for example, with any of the following secondary resinifying components:

(a) 30 kilos of phenyl urea+15 litres of caustic soda solution of 10% strength_____ 1 hour on the water bath.
(b) 15 kilos of thio urea+15 litres of caustic soda solution of 10% strength_____ ¾ hour on the water bath.
(c) 15 kilos of aniline+15 litres of caustic soda solution of 10% strength_____ ½ hour on the water bath.
(d) 15 kilos of dicyandiamide+20 litres of ammonia of 10% strength_____ 5 hours on the water bath.
(e) 30 kilos of urea+15 litres of caustic soda solution of 10% strength_____ 8 hours on the water bath.
(f) 30 kilos of biuret+15 litres of caustic soda solution of 10% strength_____ 5 hours on the water bath.
(g) 25 kilos of anhydroformaldehyde-aniline+15 litres of caustic soda solution of 10% strength_____ 3 hours on the water bath.
(h) 15 kilos of β-naphthylamine dissolved in 150 litres of alcohol+15 litres of caustic soda solution of 10% strength. Within ½ hour on the air-bath.
(i) 15 kilos of phenol+3 kilos of hexamethylene-tetramine_____ 3 hours on the water bath.
(k) 15 kilos of soluble condensation product from phenol and formaldehyde dissolved in 100 litres of alcohol+10 litres of caustic soda solution of 10% strength_____ ¼ hour on the water bath.
(l) 15 kilos of liquid sulfurized phenol-resin dissolved in 100 litres of alcohol+2 kilos of ethylenediamine_____ ½ hour on the water bath.
(m) 15 kilos of β-naphthol in 100 litres of alcohol+20 grams of hexamethylene-tetramine_____ 20 minutes on the water bath In all these examples, which could be easily multiplied, the water-insoluble resin separates either by merely cooling or after addition of cold water, generally in the form of masses, which are snow white or feebly colored, of silky lustre and generally capable of being drawn into threads; by kneading them with water or dissolving them in alcohol or reprecipitating by addition of water they are easily obtained in a neutral condition; they are applicable in known manner for making varnishes, lacquers or artificial materials.

What we claim is:—

1. In the manufacture of hydrophobe resins by heating a primary condensation product of urea and formaldehyde in presence of an agent yielding with formaldehyde a resinous condensation product until on cooling or diluting with cold water a coherent water insoluble hydrophobe resin is separated from the reaction mixture, the feature of performing the condensation at least from the moment when said resin forming agent is added up to the moment when the hydrophobe resin is separated, in presence of a basic condensing agent and in absence of acid yielding substances.

2. In the manufacture of hydrophobe resins by heating a primary condensation product of urea and formaldehyde in presence of thiourea until on cooling or diluting with cold water a coherent water insoluble hydrophobe resin is separated from the reaction mixture, the feature of performing the condensation at least from the moment when the thiourea is added up to the moment when the hydrophobe resin is separated, in presence of a basic condensing agent and in absence of acid yielding substances.

3. In the manufacture of hydrophobe resins by heating a primary condensation product of urea and formaldehyde in presence of phenol until on cooling or diluting with cold water a coherent water insoluble hydrophobe resin is separated from the reaction mixture, the feature of performing the condensation at least from the moment when the phenol is added up to the moment when the hydrophobe resin is separated, in presence of a basic condensing agent and in absence of acid yielding substances.

ALPHONSE GAMS.
GUSTAVE WIDMER.
KARL FREY.